US012770523B2

(12) United States Patent
Bageshwar et al.

(10) Patent No.: US 12,770,523 B2
(45) Date of Patent: Oct. 20, 2026

(54) INTEGRITY OF TRACKS ESTIMATED BY DETECT AND AVOID TRACKING SYSTEM

(71) Applicant: Honeywell International Inc., Charlotte, NC (US)

(72) Inventors: Vibhor L. Bageshwar, Rosemount, MN (US); Sara D. Bauman, Duvall, WA (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 127 days.

(21) Appl. No.: 18/752,308

(22) Filed: Jun. 24, 2024

(65) Prior Publication Data

US 2026/0057791 A1 Feb. 26, 2026

(51) Int. Cl.

*G08G 5/57* (2025.01)
*G08G 5/80* (2025.01)
*G08G 5/90* (2025.01)

(52) U.S. Cl.

CPC ................. *G08G 5/57* (2025.01); *G08G 5/80* (2025.01); *G08G 5/90* (2025.01)

(58) Field of Classification Search

CPC ............... G08G 5/57; G08G 5/80; G08G 5/90
USPC .......................................................... 701/120
See application file for complete search history.

(56) References Cited

U.S. PATENT DOCUMENTS 5,760,737 A 6/1998 Brenner
9,507,020 B2 11/2016 Bageshwar et al.
9,784,844 B2 10/2017 Kana et al.
9,851,437 B2 12/2017 Bageshwar et al.
10,309,784 B2 6/2019 Bageshwar et al.
10,605,607 B2 3/2020 Bageshwar et al.
11,175,142 B2 11/2021 Bageshwar et al.
11,181,935 B2 11/2021 Choi et al.

FOREIGN PATENT DOCUMENTS

EP 4296993 A1 12/2023
FR 2931249 A1 11/2009

OTHER PUBLICATIONS

Bageshwar et al., "Multi-Intruder Aircraft, Multi-Sensor Tracking System", 2015 IEEE/AIAA 34the Digital Avionics Systems Conference (DASC), Sep. 13, 2015, pp. 5A5-1 through 5A5-13.

(Continued)

*Primary Examiner* — Maceeh Anwari
(74) *Attorney, Agent, or Firm* — Fogg & Powers LLC

(57) ABSTRACT

A system comprises a processor onboard a vehicle, surveillance sensors, and a DAA module that receives sensor measurement tracks and includes a tracking system that tracks objects in an environment around the vehicle. The tracking system comprises a data association module that includes a track-to-track function that outputs main solution and sub-solution tracks with track information. An integrity module communicates with the DAA module and comprises a track integrity system in communication with the data association module and operative to provide integrity checks. The track integrity system compares, selects, and outputs a main solution track or sub-solution tracks based on correlated tracks provided by the track-to-track function and solution separation; sends a track solution that passes integrity tests to a prune function, and sends tracks that fail to pass integrity tests to the data association module; and assures the integrity of tracks correlated and estimated by the tracking system.

20 Claims, 7 Drawing Sheets

(56) References Cited

OTHER PUBLICATIONS

European Patent Office, "Extended European Search Report", dated Nov. 6, 2025, from EP Application No. 25179905.2, from Foreign Counterpart to U.S. Appl. No. 18/752,308, pp. 1 through 11, Published: EP.

Bageshwar et al., "Detect and Avoid Tracking Architecture", U.S. Appl. No. 17/846,899, filed Jun. 22, 2022, pp. 1 through 44, Published: US.

Bageshwar et al., "Methodology to Provide Assurance of Data Association in Navigation and Radar Systems", U.S. Appl. No. 18/473,889, filed Sep. 25, 2023, pp. 1 through 34, Published: US.

INTEGRITY OF TRACKS ESTIMATED BY DETECT AND AVOID TRACKING SYSTEM

BACKGROUND

An uncrewed aircraft system (UAS) must perform the same tasks as piloted aircraft to operate in the National Airspace (NAS). One of the key capabilities required for UAS operation in the NAS is to detect and avoid (DAA) air traffic. Thus, UAS are equipped with DAA systems to detect and track air traffic and generate avoidance or guidance commands, such as remain well clear or collision avoidance, to enable UAS to remain well clear of air traffic and satisfy regulations governing operations in the NAS. DAA systems track cooperative traffic and non-cooperative traffic using multiple surveillance sensors, including cooperative sensors and non-cooperative sensors.

A multi-sensor fusion system has been developed that tracks multiple intruder aircraft in three-dimensions (3D) relative to an ownship vehicle using cooperative sensors and non-cooperative sensors in one framework. This multi-sensor fusion system associates the measurements from both the cooperative and non-cooperative sensors that originate from the same intruder aircraft to provide one statistically optimal estimate of the intruder aircraft trajectory statistics, or tracks, relative to the ownship aircraft. Evaluation and guidance systems use these tracks to ensure the ownship vehicle remains well clear of other air traffic.

However, there is a need to assure the integrity of estimated tracks that have been formed through association, or correlation, of measurement tracks from multiple sensors.

SUMMARY

A system comprises at least one processor onboard a vehicle; a plurality of surveillance sensors in operative communication with the at least one processor, the surveillance sensors comprising one or more cooperative sensors, one or more non-cooperative sensors, or a combination of one or more cooperative sensors and one or more non-cooperative sensors; and a detect and avoid module hosted by the at least one processor. The detect and avoid module is configured to receive respective measurement tracks from the surveillance sensors, and includes a tracking system configured to track one or more objects in an environment around the vehicle. The tracking system comprises a data association module that includes a track-to-track function operative to generate and output main solution tracks and sub-solution tracks with track information that includes a total number of tracks, and a track weight, a sensor weight, a state mean vector, and a state covariance matrix for each track; and an integrity module hosted by the at least one processor and in operative communication with the detect and avoid module. The integrity module comprises a track integrity system in operative communication with the data association module, the track integrity system operative to provide integrity checks with fault detection and exclusion, which include one or more discriminators and one or more decision thresholds. The track integrity system is operative to compare, select, and output a main solution track or one or more sub-solution tracks based on associated, or correlated, tracks provided by the track-to-track function from the data association module and at least one solution separation technique. The track integrity system is operative to select and send a track solution that passes integrity tests to a prune sub-function, and to send back the main solution track or the one or more sub-solution tracks that fail to pass the integrity tests to the data association module for further processing and to assure an integrity of tracks correlated and estimated by the tracking system.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
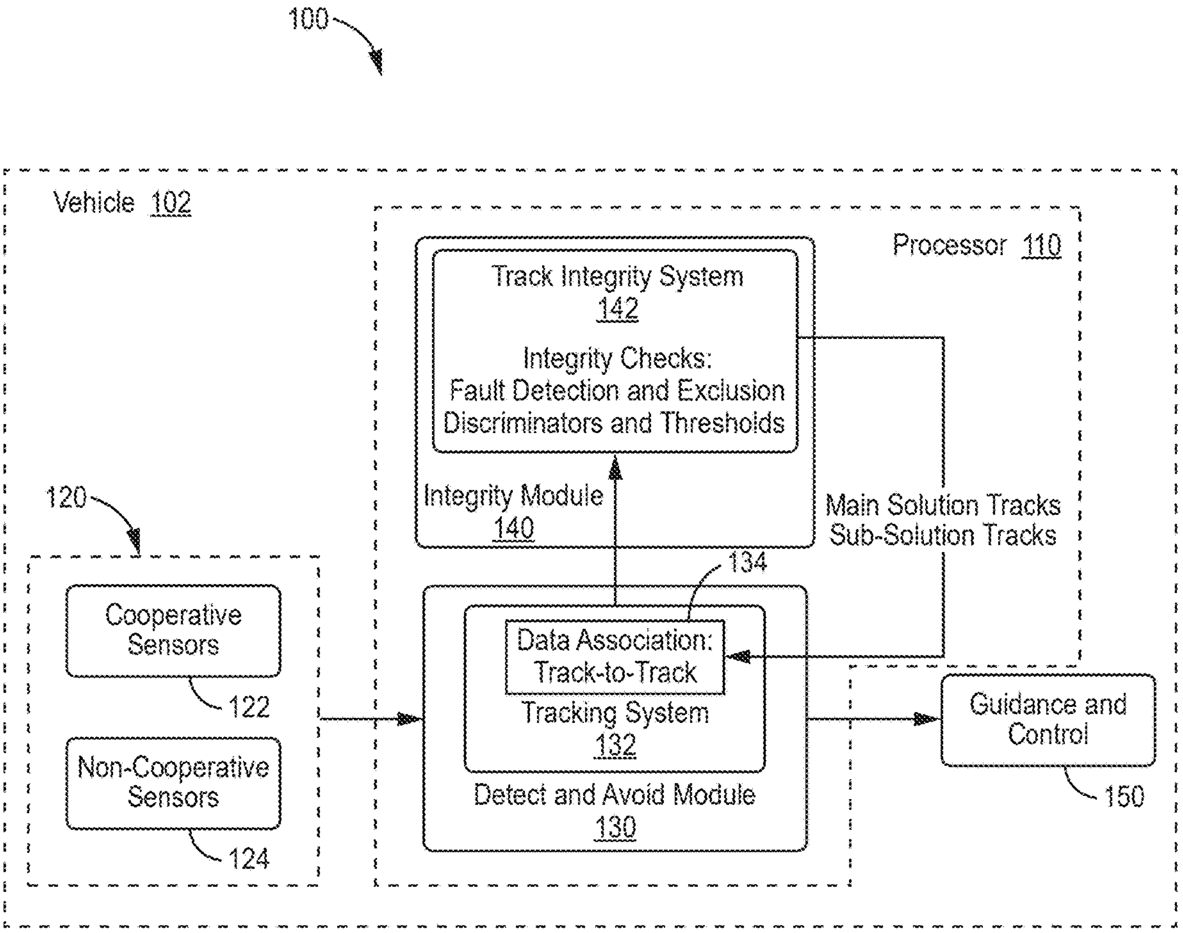
FIG. 1 is a block diagram of a system for providing integrity checks for a DAA tracking system of a vehicle, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for assuring integrity of tracks estimated by a DAA tracking system are described herein. The basic approach to assure integrity of the tracks estimated by the DAA tracking system uses solution separation to assure the association, or correlation, of the measurement tracks contributing to the tracks estimated by the tracking system. The implementation of solution separation coupled with track statistics from different combinations of measurement tracks estimated by the DAA tracking system is used to assure the integrity of the tracks.

In general, the present DAA tracking system is operative to track various objects using cooperative and non-cooperative surveillance sensors. The DAA tracking system fuses surveillance sensor measurement statistics, or measurement tracks, to estimate one statistically optimal track for an object relative to an ownship vehicle, where the object may be an intruder aircraft and the ownship vehicle may be an aircraft, including an uncrewed aircraft (e.g., part of UAS) or an urban air mobility (UAM) vehicle.

As used herein, a "track" includes trajectory statistics of an object relative to an ownship vehicle. A "measurement track" is a sequence of measurement statistics originating from an object (e.g., intruder aircraft) with an identification number (ID). An "internal track" refers to an estimated track within the tracking system that has not been sent to any downstream systems.

Applications downstream of the DAA tracking system require one track per object regardless of the number surveillance sensors observing the object. The DAA tracking system must identify and fuse the measurement tracks that originate from the same object regardless of the quality of the measurement tracks provided by the sensor. Sensor measurement errors can cause the DAA tracking system to fuse measurement tracks that originate from different objects or to not fuse measurement tracks that originate from the same object. The DAA tracking system must also prevent false measurements from causing correlation with non-existent objects leading to tracks for non-existent aircraft in random areas of the airspace. Measurement track mis-associations, or miscorrelations, may result in more tracks than actual objects operating in the airspace surrounding the ownship aircraft, tracks where objects are shown to be operating in incorrect areas of the airspace, or false tracks for non-existent objects. This results in guidance algorithms computing well clear maneuvers for non-existent objects or too many objects, and maneuvers can be initiated too early during encounters, can be performed too aggressively resulting in expending more fuel than necessary, or can direct the ownship aircraft to dangerous areas of the airspace.

The present approach assures the integrity of the tracks estimated by the DAA tracking system, by assuring the integrity of the association, or correlation, outcomes performed by the DAA tracking system. The present methods also minimize clutter for pilot displays.

The present approach augments the tracking framework with solution separation for association, or correlation, integrity. The present system monitors association, or correlation, of measurement tracks to satisfy track requirements with different combinations of surveillance sensors contributing to a track estimated by the tracking system. This process assures the association, or correlation, of tracks and resulting track statistics. In addition, common processing of surveillance sensor measurement tracks takes place in a single tracking and solution separation framework. As a result, the association, or correlation, of cooperative and non-cooperative surveillance sensor contributions to the estimated tracks can be assured in one framework. The present augmented tracking system can exclude mis-associations, or mis-correlations, due to faulty sensor measurement tracks, large measurement track errors, and false sensor measurement tracks, and can recover faster once a sensor measurement track becomes available or useable again.

The threat space includes surveillance sensor fault modes. These include cooperative sensor fault modes, and non-cooperative sensor fault modes.

Further details of various embodiments are described hereafter and with reference to the drawings.

FIG. 1 is a block diagram of a system 100 for providing integrity checks for a DAA tracking system of a vehicle 102, according to one embodiment. The system 100 generally comprises at least one processor 110 onboard vehicle 102, such as an aircraft, and a plurality of surveillance sensors 120 in operative communication with processor 110. The surveillance sensors 120 can include one or more cooperative sensors 122, one or more non-cooperative sensors 124, or a combination of cooperative sensors 122 and non-cooperative sensors 124. Examples of cooperative sensors 122 include Automatic Dependent Surveillance-Broadcast (ADS-B) sensors, and Traffic Collision Avoidance System (TCAS) Mode-S sensors. Examples of non-cooperative sensors 124 include TCAS Mode C sensors, air-based radar, ground-based radar, and vision sensors such as electro-optical (EO) or infrared cameras.

The cooperative sensors 122 are operative to provide a respective first measurement track for each of one or more objects in an environment around vehicle 102. Each respective first measurement track includes a respective first track identifier (ID). The non-cooperative sensors 124 include three categories of sensors. A first category of non-cooperative sensors 124 is operative to provide a respective second measurement track for each of the one or more objects around the vehicle, with each respective second measurement track including a respective second track ID. A second category of non-cooperative sensors 124 includes a first sub-category operative to provide consistent sequences of track measurements originating from a same object, but with inconsistent and changing track IDs; and a second sub-category operative to provide multiple measurement tracks with consistent IDs for an object, but with multiple measurement tracks at a measurement epoch for the object. A third category of non-cooperative sensors 124 are operative to provide measurement returns without measurement track correlation or ID.

In addition, system 100 comprises a detect and avoid module 130 hosted by processor 110, with detect and avoid module 130 configured to receive respective measurement tracks from surveillance sensors 120. The detect and avoid module 130 includes a tracking system 132 configured to track one or more objects in an environment around vehicle 102. The tracking system 132 comprises a track-to-track function in data association module 134 operative to generate and output main solution tracks and sub-solution tracks with track information that includes a total number of tracks, a track weight, a sensor weight, a state mean vector for each internal track, and a state covariance matrix for each internal track.

The system 100 also comprises an integrity module 140 hosted by processor 110 and in operative communication with detect and avoid module 130. The integrity module 140 comprises a track integrity system 142 in operative communication with data association module 134. The track integrity system 142 is operative to provide integrity checks of associated tracks using fault detection and exclusion (FDE), which include one or more discriminators and decision thresholds. The track integrity system 142 is operative to compare, select, and output a main solution track or one or more sub-solution tracks based on internal tracks provided by the track-to-track function from data association module 134 and a solution separation technique. The track integrity system 142 is operative to send back the either the main solution track or sub-solution tracks to data association module 134 for further processing and to assure the integrity of tracks estimated by tracking system 132.

In general, the integrity approach comprises the following steps: compute a main solution track that uses all sensor measurement tracks contributing to the track; compute one or more sub-solution tracks using combinations of sensors contributing to the main solution track; and compute one or more sub-sub-solution tracks using combinations of sensors contributing to each sub-solution track. Mis-associated tracks, or measurement tracks determined to not originate from the same object, are returned to the data association module for further processing. When the main solution track is estimated using measurement tracks from at least three sensors of the plurality of sensors provide measurement tracks, the one or more sub-solutions are configured to identify one mis-associated sensor measurement track, and the one or more sub-sub-solutions are configured to identify two or more mis-associated sensor measurement tracks.

As described further hereafter, tracking system 132 is operative to fuse respective measurement tracks from cooperative sensors 122 and non-cooperative sensors 124 to estimate an optimal track for each object in the operating environment around vehicle 102. The estimated tracks are used by detect and avoid module 130 to provide guidance data to various vehicle systems, such as for guidance and control (block 150), so that vehicle 102 can be operated to avoid the tracked objects.

Additional details related to various aspects of the present DAA tracking system with integrity are described hereafter.

Surveillance Sensors

The DAA tracking system supports a range of sensor modalities and fusion strategies to maximize the probability a track corresponds to an actual object, such as an intruder aircraft, and to minimize the number of false tracks. The various surveillance sensors employed in the system can be mounted onboard an ownship vehicle such as a UAS, offboard such as ground-based sensors, or both onboard and offboard sensors can be employed.

As mentioned above, the surveillance sensors can include cooperative sensors, and various categories of non-cooperative sensors. The cooperative sensors provide measurement tracks of objects, such as intruder aircraft, with an International Civil Aviation Organization (ICAO) ID. The non-cooperative surveillance sensors provide measurement tracks of objects with sensor specific IDs. The measurement tracks include a sequence of measurements originating from the same object, accompanied with either an ICAO ID or sensor specific ID.

The non-cooperative sensors can be categorized into three groups depending on the types of measurements provided: category 1—measurement tracks with consistent sensor specific IDs; category 2—measurement tracks with inconsistent IDs or multiple measurement tracks with the same ID; and category 3—measurement returns with no IDs. The typical difference between category 1 and category 2/3 non-cooperative sensors is a correlation algorithm that provides consistent track IDs, or a correlation algorithm that performs data association and provides consistent track IDs.

The category 1 non-cooperative sensors provide trusted measurement tracks of intruder aircraft with sensor specific IDs. Examples of category 1 non-cooperative sensors includes TCAS Mode-C sensors, as well as certain radars and vision sensors. The category 2 non-cooperative sensors include two sub-categories. In the first sub-category (2a), the sensor correctly provides consistent sequences of track measurements originating from the same intruder aircraft, but provides inconsistent, changing IDs of the tracks. In the second sub-category (2b), the sensor provides multiple measurement tracks with consistent IDs for intruder aircraft; however, the sensor provides multiple measurement tracks at a measurement epoch for the same intruder aircraft. The category 3 non-cooperative sensors provide measurement returns of intruder aircraft with no measurement correlation or IDs. Examples of category 2 and 3 non-cooperative sensors include some radars and vision sensors such as EO or infrared cameras.

Figure 2:
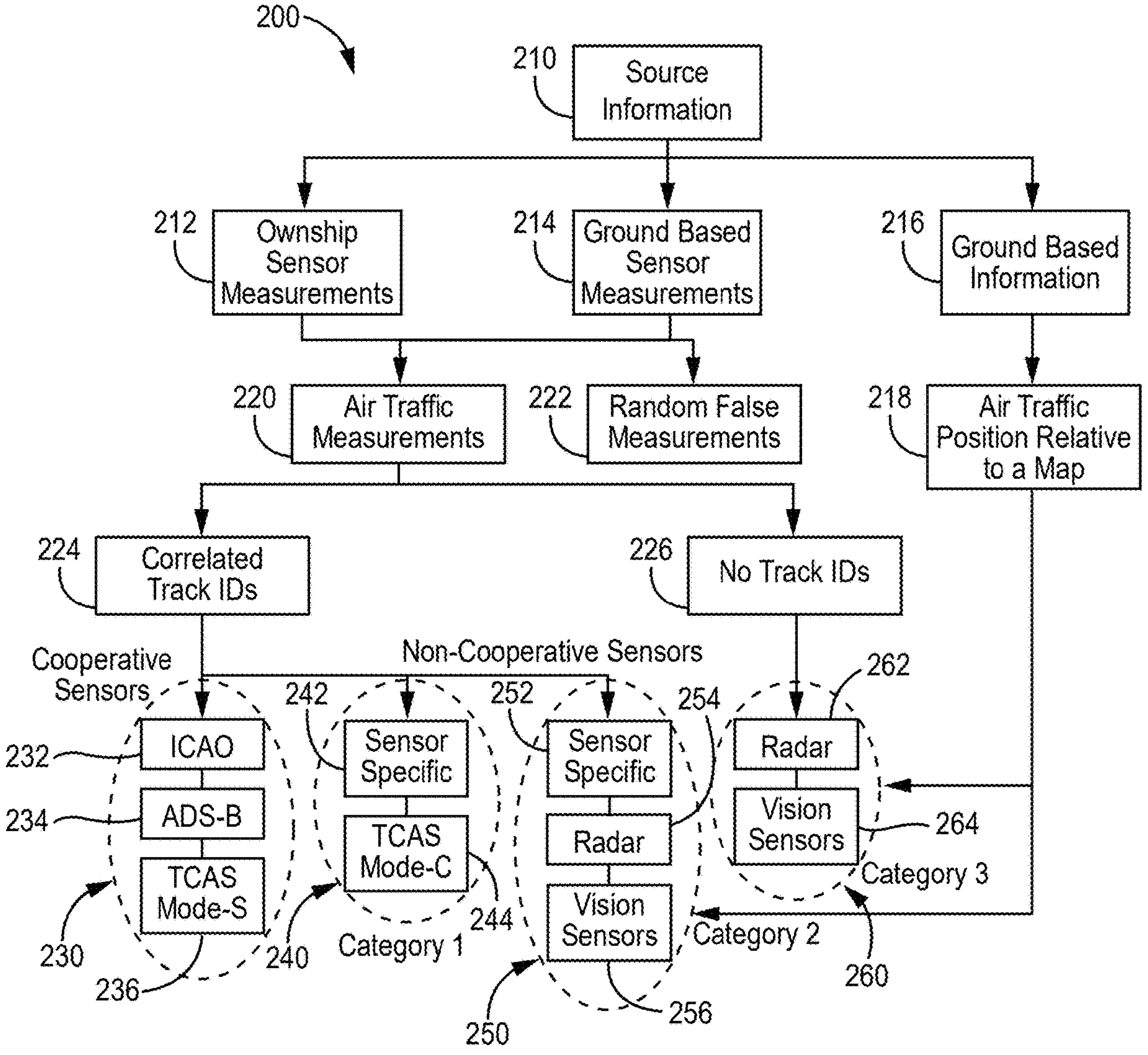
FIG. 2 is a block diagram of a surveillance sensor arrangement that can be employed in a DAA tracking system, according to one implementation.

FIG. 2 is a block diagram of a surveillance sensor arrangement 200, according to one implementation, which can be employed in a DAA system with integrity. The sensors and information sources shown in FIG. 2 can be mounted on an ownship aircraft (e.g., UAS air-based sensors), located on the ground (ground-based sensors), or both air-based and ground-based sensors can be employed.

As depicted in FIG. 2, a source of information 210 provides ownship sensor measurements 212, ground-based sensor measurements 214, and ground-based information 216 such as air traffic position relative to a map (block 218). The ownship sensor measurements 212 and ground-based sensor measurements 214 can both provide air traffic measurements 220, and random false measurements 222. The air traffic measurements 220 can include correlated track IDs (block 224), or no track IDs (block 226).

A set of cooperative sensors 230 are equipped to provide measurement tracks with ICAO IDs 232, and include ADS-B sensors 234, and TCAS Mode-S sensors 236. A set of category 1 non-cooperative sensors 240 are equipped to provide measurement tracks with consistent sensor specific IDs 242, and include TCAS Mode-C sensors 244. A set of category 2 non-cooperative sensors 250 are equipped to provide measurement tracks with inconsistent sensor specific IDs 252, and include some radar sensors 254, and some vision sensors 256. A set of category 3 non-cooperative sensors 260 are equipped to provide measurement returns with no track IDs (from block 226), and include other radar sensors 262, and other vision sensors 264. In addition, ground-based information such as air traffic position relative to a map (from block 218) can fall under category 2 non-cooperative sensors 250 and the category 3 non-cooperative sensors 260.

DAA Tracking Architecture

Figure 3:
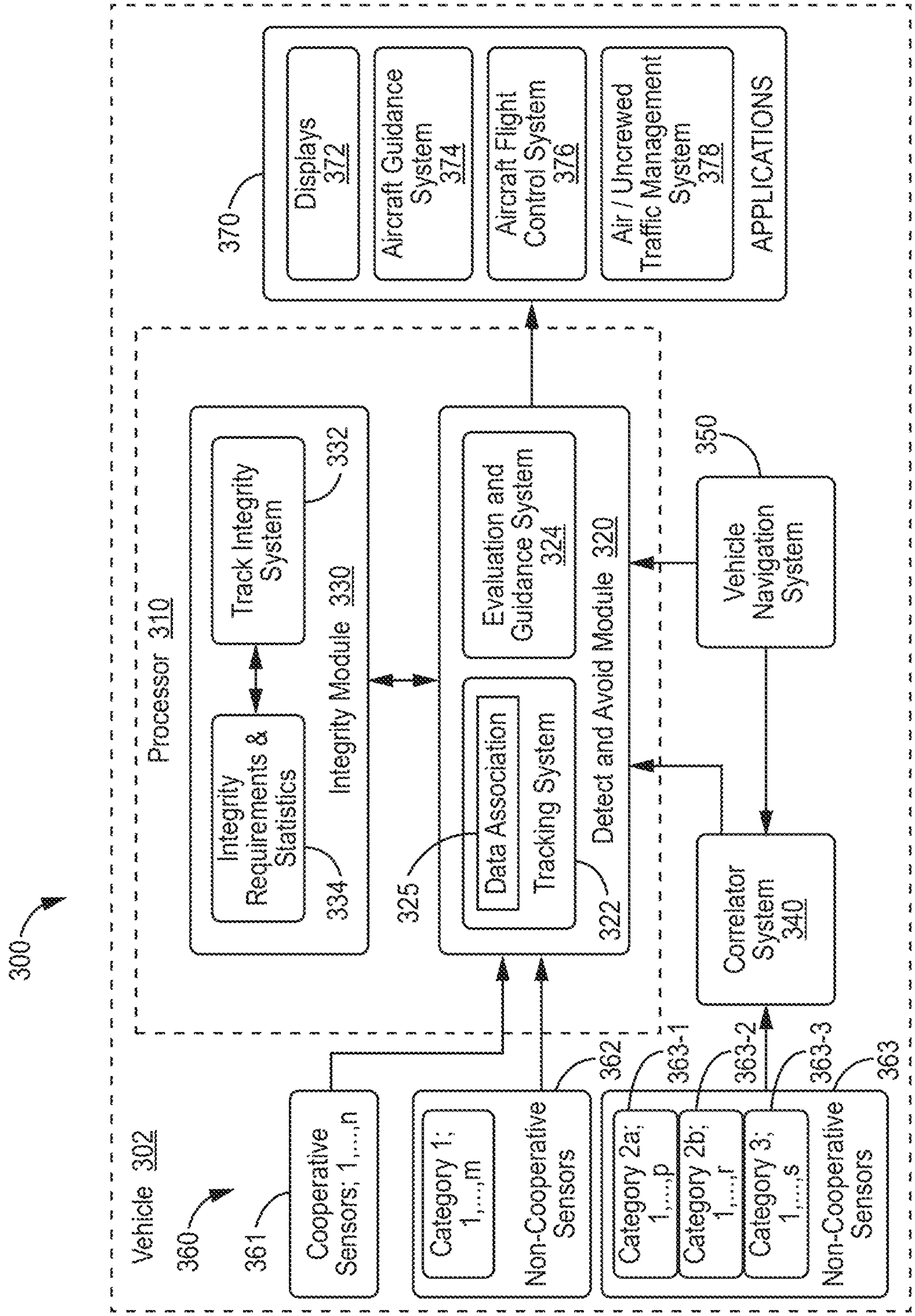
FIG. 3 is a block diagram of a DAA tracking architecture with integrity, according to one embodiment.

FIG. 3 is a block diagram of a DAA tracking architecture with integrity 300 for a vehicle 302, according to one embodiment. The DAA tracking architecture with integrity 300 generally comprises at least one processor 310 onboard vehicle 302, such as a UAS vehicle or other aircraft, a detect and avoid module 320 hosted by processor 310, and an integrity module 330 hosted by processor 310 and in operative communication with detect and avoid module 320. In addition, a correlator system 340 operatively communicates with detect and avoid module 320. The correlator system 340, in some embodiments, can be hosted by processor 310 or, in other embodiments, can be hosted by non-cooperative sensors 363. A vehicle navigation system 350 operatively communicates with detect and avoid module 320, and with correlator system 340.

A plurality of surveillance sensors 360 are in operative communication with processor 310. The surveillance sensors 360 can include a first set 361 of one or more cooperative sensors, a second set 362 of one or more non-cooperative sensors (category 1), and a third set 363 of one or more non-cooperative sensors (categories 2 and 3). The detect and avoid module 320 is in operative communication with the first set 361 of one or more cooperative sensors, and the second set 362 of one or more non-cooperative sensors.

The first set 361 of one or more cooperative sensors (1, . . . , n) are operative to provide respective first measurement tracks for one or more objects in an environment around vehicle 302. Each respective first measurement track includes a respective first track identifier (ID). The second set 362 of one or more non-cooperative sensors (category 1; 1, . . . , m) is operative to provide respective second measurement tracks for one or more objects around vehicle 302. Each respective second measurement track includes a respective second track ID.

In the third set 363 of one or more non-cooperative sensors, the category 2 sensors include a first sub-category 363-1 of non-cooperative sensors (category 2a; 1, . . . , p), and a second sub-category 363-2 of non-cooperative sensors (category 2b; 1, . . . , r). The first sub-category 363-1 of non-cooperative sensors is operative to provide consistent sequences of track measurements originating from the same object, but with inconsistent and changing track IDs. The second sub-category 363-2 of non-cooperative sensors is operative to provide multiple measurement tracks with consistent IDs for the object, but with the multiple measurement tracks at a measurement epoch for the object. Also in the third set 363, the category 3 sensors include one or more non-cooperative sensors 363-3 (1, . . . , s), which are operative to provide measurement returns without a measurement track correlation or ID.

The detect and avoid module 320 includes a tracking system 322, and an evaluation and guidance system 324. The tracking system 322 is configured to receive the respective first measurement tracks from the first set 361 of cooperative sensors, and the respective second measurement tracks from the second set 362 of non-cooperative sensors. The tracking system 322 is configured to track one or more objects in an environment around vehicle 302. The tracking system 322 comprises a track-to-track function in data association module 325 operative to generate and output main solution tracks and sub-solution tracks with track information that includes a total number of estimated tracks, a track weight, sensor weights, a state mean vector for each internal track, and a state covariance matrix for each internal track.

The correlator system 340 is in operative communication with the third set 363 of non-cooperative sensors. The correlator system 340 is configured to directly receive sensor measurement tracks from the category 2 sensors including the first sub-category 363-1 of non-cooperative sensors (category 2a), and the second sub-category 363-2 of non-cooperative sensors (category 2b). The correlator system 340 is also configured to directly receive sensor measurement returns from the category 3 sensors including non-cooperative sensors 363-3.

In one implementation, correlator system 340 is operative to identify sequences of measurements that originate from the same object regardless of non-cooperative sensor and measurement track ID. The correlator system 340 overrides any ID provided by a sensor and assigns an ID to a measurement track itself for any sensors in the first sub-category 363-1 of non-cooperative sensors. The correlator system 340 fuses measurement returns from multiple measurement tracks of a sensor to generate a fused measurement track and assigns an ID to the fused measurement track, overriding any track ID assigned by the sensor, for any sensors in the second sub-category 363-2 of non-cooperative sensors. The correlator system 340 also identifies sequences of measurement returns that originate from the same object and assigns the sequences an ID for any non-cooperative sensors 363-3.

The correlator system 340 processes the various sensor measurement returns received from the third set 363 of non-cooperative sensors, as well as navigation data from vehicle navigation system 350. The correlator system 340 then outputs correlated measurement tracks, based on the sensor measurements and navigation data, to detect and avoid module 320.

The tracking system 322 of detect and avoid module 320 is operative to fuse the respective first measurement tracks from the first set 361 of cooperative sensors, the respective second measurement tracks from the second set 362 of non-cooperative sensors, and the correlated measurement tracks from correlator system 340. The tracking system 322 correlates and fuses the measurement tracks to estimate an optimal track for each of the objects. The estimated track includes trajectory statistics for each object, such as intruder aircraft, with consistent IDs.

The integrity module 330 comprises a track integrity system 332, which is in operative communication with data association module 325 of tracking system 322. An integrity requirements and statistics module 334 is in operative communication with track integrity system 332. As described in further detail hereafter, track integrity system 332 is operative to provide integrity checks of the correlated tracks with correlation fault detection and correlation exclusion performed to assure measurement tracks have been correctly associated, which include one or more correlation discriminator thresholds. The track integrity system 332 is operative to compare, select, and output a main solution track, or one or more sub-solution tracks based on correlated tracks provided by the track-to-track function from data association module 325. For example, a tracking system 322 can be employed to compute a main solution track that uses all sensor measurements contributing to a given track; compute one or more sub-solution tracks using combinations of sensors contributing to the main solution track; and compute one or more sub-sub-solution tracks using combinations of sensors contributing to each sub-solution track. The track integrity system 332 is operative to send back the mis-associated tracks to data association module 325 for further processing and to assure the integrity of tracks estimated by tracking system 322.

The estimated tracks, with assured integrity, are provided by tracking system 322 to evaluation and guidance system 324 in detect and avoid module 320, to provide guidance data to various vehicle applications 370, such that vehicle 302 can be operated to avoid any objects. Examples of vehicle applications 370 can include applications for one or more displays 372, an aircraft guidance system 374, an aircraft flight control system 376, an air/uncrewed traffic management system 378, and the like.

Figure 4:
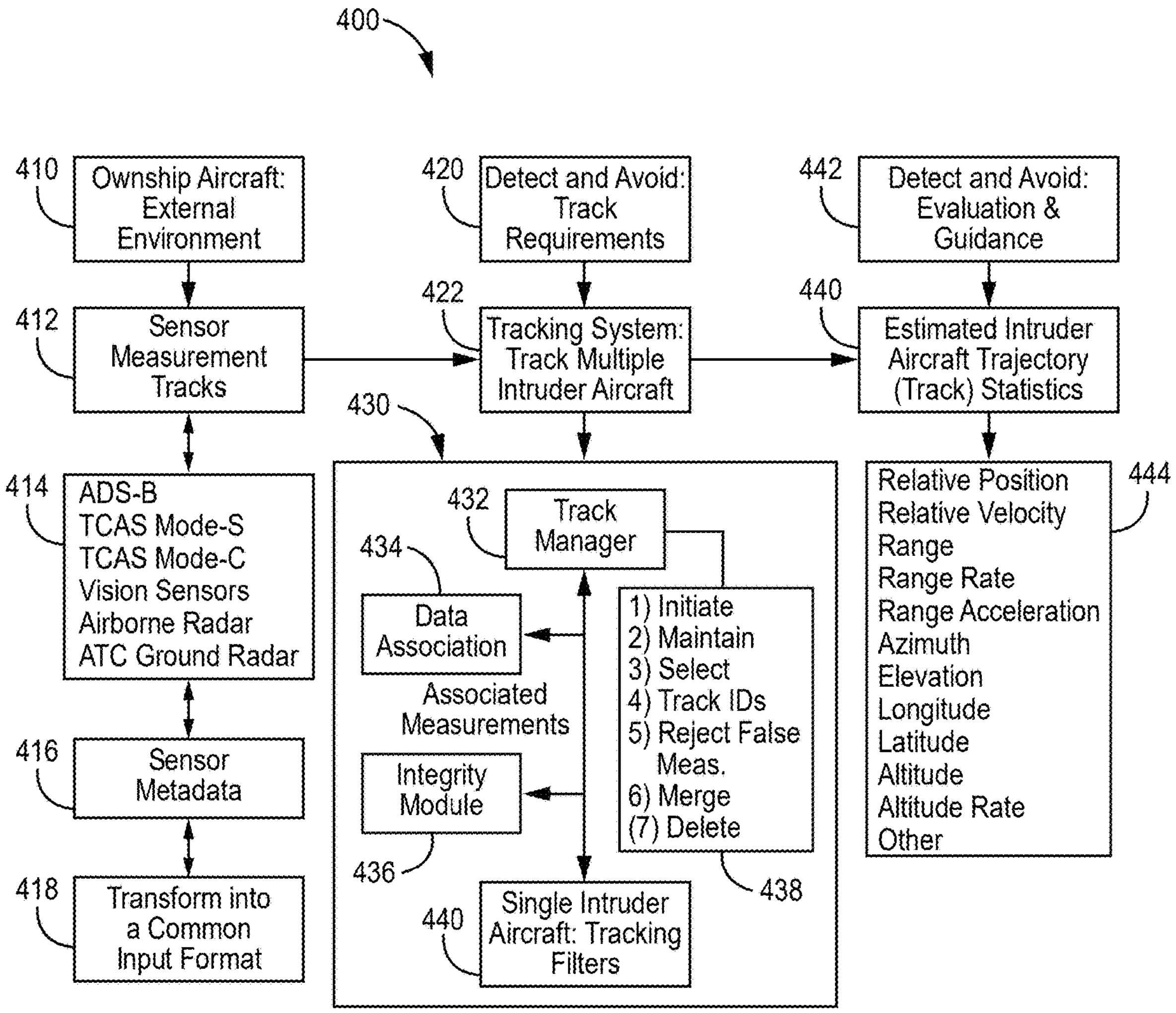
FIG. 4 is a block diagram of an exemplary aircraft tracking system, which can be employed in a DAA tracking architecture with integrity.

FIG. 4 is a block diagram of an exemplary aircraft tracking system 400, which can be employed in a DAA tracking architecture with integrity. The aircraft tracking system 400 allows cooperative and non-cooperative vehicles, such as intruder aircraft, to be tracked in the same framework.

As shown in FIG. 4, with respect to an external environment of an ownship aircraft (block 410), a set of surveillance sensors provide sensor measurement tracks (block 412) for use by aircraft tracking system 400. The surveillance sensors can be air-based or ground-based sensors. Examples of such sensors include ADS-B sensors; TCAS for active surveillance of Mode-S equipped air traffic; TCAS for active surveillance of Mode-C equipped air traffic; vision-based sensors such as electro-optical or infrared (EO/IR) imaging sensors; airborne radar; and air traffic control (ATC) ground-based radar (block 414). In addition, sensor metadata can be obtained (block 416), and sensor measurements can be transformed into a common input format (block 418) using the sensor metadata. The sensor metadata can include units, reference frame, frequency, time delay statistics, probability of detection, probability of false alarm, and the like. As also shown in FIG. 4, a set of detect and avoid track requirements (block 420) are provided to the tracking system for metrics to track multiple intruder aircraft (block 422) using the sensor measurement tracks (from block 412).

An associated tracking algorithm 430 generally includes a track manager function 432, a data association function 434, and an integrity module 436. The track manager function 432 operates together with data association function 434 and integrity module 436 to perform the following tasks: 1) initiate intruder aircraft tracks; 2) maintain intruder aircraft tracks; 3) select associated measurement tracks; 4) manage the track IDs output by the surveillance sensors; 5) reject false measurement tracks and minimize generation of false tracks; 6) merge track statistics; and 7) delete tracks for intruder aircraft that leave a sensor's field of regard (FOR) (block 438). In addition, tracking algorithm 430 provides tracking filters for single intruder aircraft (block 440), which interact with track manager function 432, data association function 434, and integrity module 436. Further details of the operation of a tracking algorithm are described hereafter with respect to FIG. 5.

The tracking algorithm 430 operates to compute estimated intruder aircraft traffic trajectory statistics (tracks) (block 440), which are sent downstream to detect and avoid evaluation and guidance functions (block 442). The computed trajectory statistics, or tracks, can include mean and variance of the relative position, relative velocity, range, range rate, range acceleration, azimuth angle, elevation angle, longitude, latitude, altitude, altitude rate, or other statistics such as geodetic position, turn rate, and ground speed (block 444). Other trajectory statistics are possible depending on the functionality of the downstream systems.

Figure 5:
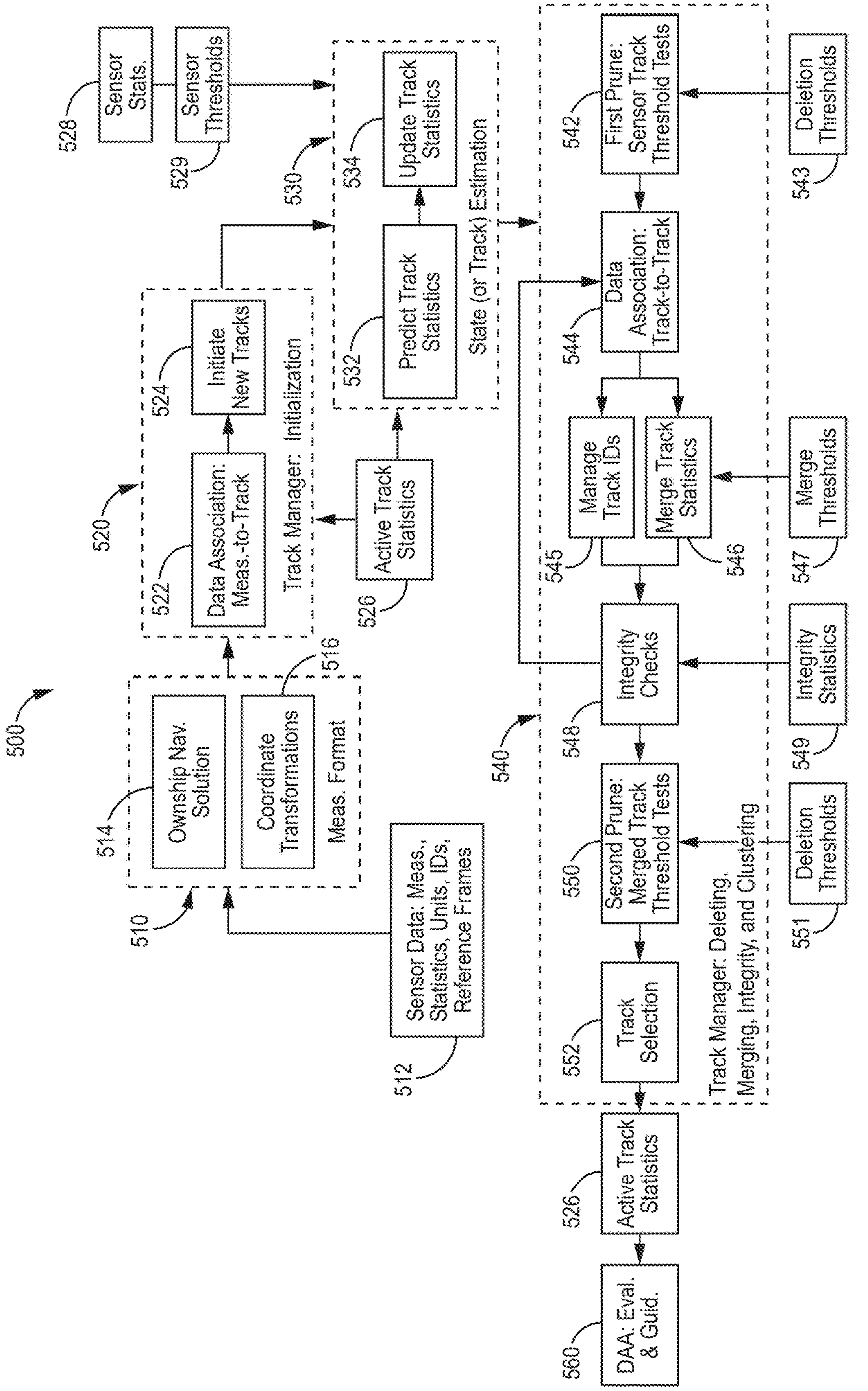
FIG. 5 is a block diagram of an exemplary tracking algorithm, which can be employed in a DAA tracking architecture with integrity.

FIG. 5 is a functional block diagram of an exemplary tracking algorithm 500, which can be employed in a DAA tracking architecture with integrity. The tracking algorithm 500 generally includes a measurements format function 510; a first track manager function 520 in operative communication with the measurements format function 510; a state (or track) estimation function 530 in operative communication with the first track manager function 520; and a second track manager function 540 in operative communication with the state estimation function 530. The various functions (and sub-functions) of tracking algorithm 500 operate together to estimate a statistically optimal track for each object from any combination of cooperative or non-cooperative sensors providing sensor measurement tracks originating from each object.

The measurements format function 510 is operative to receive sensor data, including measurements, statistics, units, IDs, or reference frames (block 512), which are combined with an ownship navigation solution (block 514) to compute coordinate transformations for measurement tracks (block 516) and resolve the measurement tracks to a consistent reference frame, or tracking frame.

The first track manager function 520 performs initialization of the measurement tracks received from the measurements format function 510 by using a data association sub-function that performs measurement-to-track associations (block 522), or, more specifically, determines whether a sensor measurement track originates from an actively tracked object. If the sensor measurement track originates from an actively tracked object, then this data association sub-function assigns the sensor measurement track to the corresponding track. If the sensor measurement track does not originate from an actively tracked object, then the data association sub-function can initiate a new track (block 524) for the object.

The state estimation function 530 predicts track statistics provided by active track statistics 526 using sensor metadata provided by sensor statistics 528 and sensor thresholds 529. The state estimation function 530 fuses predicted track statistics 532 with the statistics of the measurement tracks (from track manager function 520) in the updated track statistics function 534 using sensor metadata provided by sensor statistics 528 and sensor thresholds 529. This provides an estimate of the track statistics of the object relative to the ownship aircraft.

The second track manager function 540 performs various operations including deleting, merging, integrity, and clustering operations for the estimated track statistics from state estimation function 530. In particular, a first prune sub-function includes sensor track threshold tests (block 542) that use a first set of deletion thresholds 543 to decide whether to keep or delete sensor tracks and associated track IDs. The sensor tracks that are kept are sent to a data association track-to-track sub-function (block 544), to manage track IDs (block 545) and merge track statistics (block 546) using a set of merge thresholds 547.

An integrity checks sub-function 548 performs fault detection and exclusion (FDE) using discriminators and thresholds, based on received track statistics (from block 546) and on integrity statistics 549. The integrity checks sub-function 548 compares, selects, and outputs the main solution track, or one or more sub-solution tracks based on correlated tracks provided by the data association track-to-track sub-function (block 544). For each track, integrity checks sub-function 548 sends the track solution that passes the integrity tests to a second prune sub-function that includes merged track threshold tests (block 550). If the main solution track does not pass the integrity checks, then the integrity checks sub-function 548 sends the sub-solution tracks that do not pass the integrity checks back to the data association track-to-track sub-function (block 544) for further processing. The second prune sub-function (block 550) uses a set of deletion thresholds 551 to decide whether to keep or delete the merged tracks. The tracks that pass the deletion thresholds are sent to a track selection sub-function 552 and are output as the active track statistics 526. These active track statistics 526 are sent to downstream systems such as DAA evaluation and guidance functions (block 560).

For example, multiple sensors can simultaneously provide measurement tracks originating from the same object with a combination of ICAO IDs and sensor specific IDs. The track manager function maintains the track IDs from all sensors contributing to a particular track. Additionally, the track manager function adds or deletes a track ID associated with an estimated track as the object enters or leaves a sensor's FOR. The track manager function also maintains the track IDs associated with the estimated track if the object or target leaves the FOR of one sensor but remains within the FOR of other sensors.

Data Association: Track-to-Track

The outputs of the data association track-to-track sub-function (544) are the tracks resulting from the merge track statistics (546) and the manage track IDs (545) functions. For example, for the main solution tracks: J≡total number of main solution tracks, where the total number of main solution tracks is user selected. The track weights are: $w_j \forall j=1, \ldots, J$ and the sensor weights are: $w_{j,i} \forall i=1, \ldots, S$. The weight of a contributing sensor to track j is surveillance sensor dependent. The sensor weight is independent of track weight, with:

$$S \equiv \text{total number of surveillance sensors contributing to a track;}$$

$$N \equiv \text{total number of cooperative sensors contributing to a track; and}$$

$$M \equiv \text{total number of non-cooperative sensors contributing to a track.}$$

The state mean vector $x_j$ is the state mean vector for track j, and can be, for example, represented by:

$$x_j = \begin{bmatrix} p_j \\ r_j \end{bmatrix} = \begin{bmatrix} 3D \text{ position} \\ \text{range} \end{bmatrix}$$

where a 3D position vector is resolved in a user-selected frame and the range is, for example, from an ownship aircraft to an intruder aircraft. The state mean vector can be selected in different ways as known to those skilled in the art. The state covariance matrix $P_j$ is the state covariance matrix for track j.

Integrity Checks

The integrity checks sub-function (548) is added after the data association track-to-track sub-function (544). For tracks with contributions from one sensor, the probability of hazardously misleading information is determined from the single sensor's probability of hazardously misleading information: $P(HMI)_j = P(HMI)_{sen,i}$, where $P(HMI)_j$ is the probability of hazardous misleading information for track j. For tracks with contributions from two sensors, the probability of hazardously misleading information is determined from both sensor's probability of hazardously misleading information. If the two sensors are different sensors, then, for example, $P(HMI)_j = P(HMI)_{sen,i} + P(HMI)_{sen,k} \forall i \neq k$. If the two sensors are the same type of sensor, then, for example, $P(HMI)_j = 2P(HMI)_{sen,i}$. For tracks with contributions from three or more sensors, the probability of hazardously misleading information is determined using combinations of the two previous equations.

In solution separation, a main filter is used to estimate main solution tracks with all contributing sensor measurement tracks. Additional filters use combinations of sensor measurement tracks to estimate sub-solution tracks and, if at least three surveillance sensors are contributing to a main track, to estimate sub-sub-solution tracks. For sub-solution and sub-sub-solution tracks, the contribution of one or more surveillance sensors to an internal track is excluded from contributing to the track enabling the solution separation method to identify a mis-correlated or faulty measurement track. Identification of one or more mis-correlated or faulty measurement tracks from a surveillance sensor does not preclude other measurement tracks from the same sensor to be used to estimate tracks. Thresholds include the allocation of integrity probability requirements to tracks depending on the different surveillance sensors contributing to the track. There are multiple ways to perform the allocation known to those skilled in the art, and the resulting integrity thresholds are user-selected.

Figure 6:
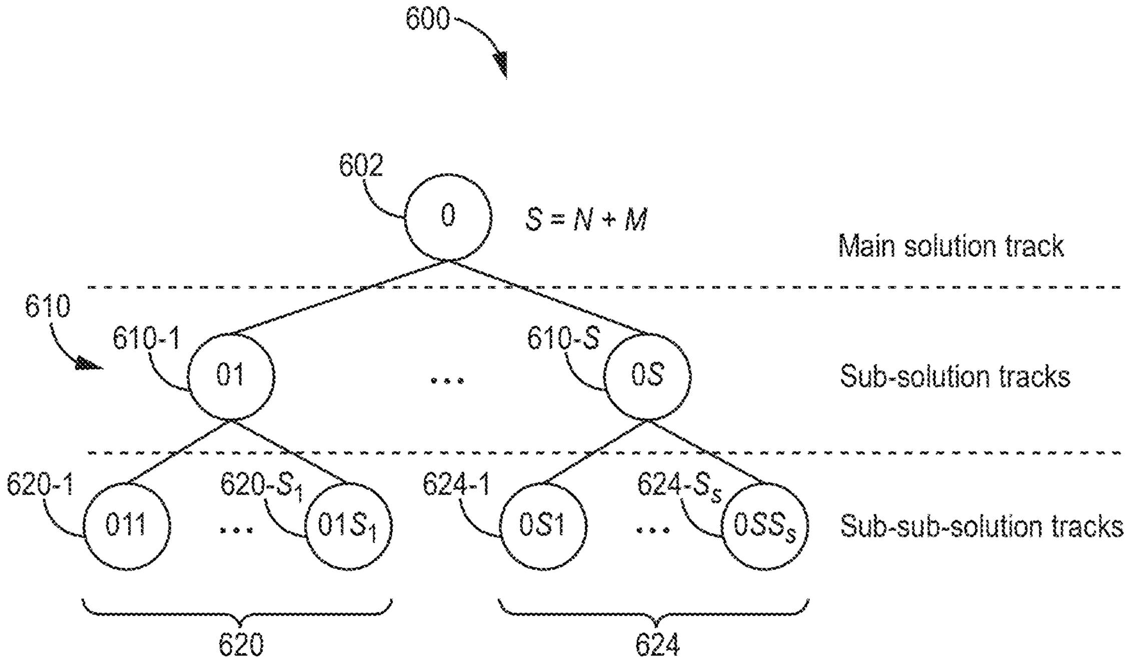
FIG. 6 is a schematic diagram of an exemplary solution separation filter arrangement, which can be utilized by an integrity checks function of a DAA tracking system.

FIG. 6 is a schematic diagram of an exemplary solution separation filter arrangement 600 that can be utilized by the integrity checks function. Each circle of filter arrangement 600 represents a tracking filter (and additional filters as needed). The tracking filter can be a Kalman filter, unscented Kalman filter, or other Bayesian filters known to those skilled in the art. A main filter 602 (circle 0) incorporates measurement tracks from all surveillance sensors contributing to a track to compute a main solution track, represented by the expression: S=N+M.

A sub-filter set 610 includes sub-filter 610-1 (circle 01) . . . sub-filter 610-S (circle 0S), and incorporates surveillance sensor measurement tracks in S−1 combinations, where each sub-filter excludes a different sensor measurement track, to compute sub-solution tracks. For example, if S<3, then the sub-solution filters can be used to identify one sensor measurement track correlation fault.

In addition, sub-sub-solution tracks can be computed using sub-sub-filters based on surveillance sensor measurement tracks from each sub-filter in sub-filter set 610, where each sub-sub-filter excludes two sensor measurement tracks. For example, a sub-sub-filter set 620 of sub-filter 610-1 includes sub-sub-filter 620-1 (circle 011) . . . sub-sub-filter 620-$S_1$ (circle $01S_1$), and incorporates surveillance sensor measurement tracks from sub-filter 610-1 in S−2 combinations, to compute the sub-sub-solution tracks. A sub-sub-filter set 624 of sub-filter 610-S includes sub-sub-filter 624-1 (circle 0S1) . . . sub-sub-filter 624-$S_s$ (circle $0SS_S$), and incorporates surveillance sensor measurement tracks from sub-filter 610-S in S−2 combinations, to compute the sub-sub-solution tracks. For example, if S>2, then the sub-sub solution filters can be used to identify sensor measurement track correlation faults.

Figure 7:
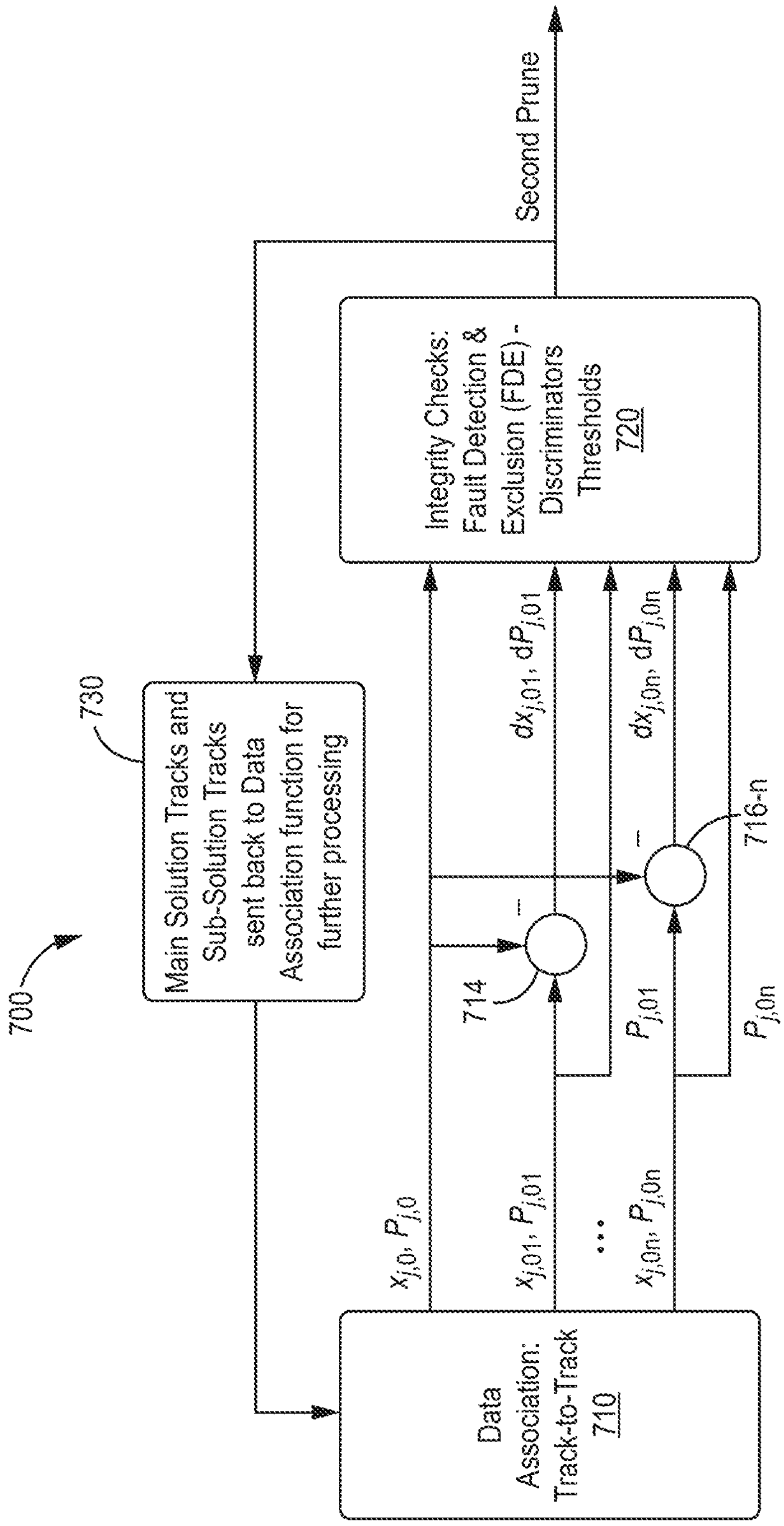
FIG. 7 is a block diagram of an integrity checks operation for a DAA tracking system, according to one implementation.

FIG. 7 is a functional block diagram of an internal integrity checks system 700 for a DAA tracking system, according to one implementation. FIG. 7 shows the interactions of a data association module 710, providing a track-to-track function, with an integrity checks module 720, including fault detection and exclusion (FDE) with discriminators and thresholds.

The data association module 710 generates and outputs a state mean vector $x_j$ and the state covariance matrix $P_j$ for all main solution tracks ($x_{j,0}$, $P_{j,0}$) from a main tracking filter to integrity checks module 720 and to a first subtractor 714. The data association module 710 also generates and outputs the state mean vector $x_j$ and the state covariance matrix $P_j$ for a first sub-solution track ($x_{j,01}$, $P_{j,01}$) to first subtractor 714. A differential ($dx_{j,01}$,$dP_{j,01}$) is calculated and output by subtractor 714 to integrity checks module 720 for use in FDE. In addition, the state covariance matrix for the first sub-solution track ($P_{j,01}$) is sent to integrity checks module 720 for use in FDE.

The data association module 710 further generates and outputs the state mean vector $x_j$ and the state covariance matrix $P_j$ for each additional sub-solution track ($x_{j,0n}$, $P_{j,0n}$) to the one or more subtractors 716-*n*, where n=2, . . . , S, which also receive the state mean vector $x_{j,0}$ and the state covariance matrix $P_{j,0}$ for all tracks. A differential ($dx_{j,0n}$, $dP_{j,0n}$) is calculated and output by the one or more subtractors 716-*n* to integrity checks module 720 for use in FDE. In addition, the state covariance matrix for each additional sub-solution track ($P_{j,0n}$) is sent to integrity checks module 720 for use in FDE.

The integrity checks module 720 performs FDE using correlation discriminators and thresholds, based on the received inputs, as describe further hereafter. The integrity checks module 720 compares, selects, and outputs main solution tracks and sub-solution tracks that are sent to a second prune function, and back to data association module 710 for further processing (block 730).

Fault Detection and Exclusion

The discriminators used in fault detection and exclusion (FDE) are represented by the following expression:

$$d_{j,0k} = \|x_{j,0} - x_{j,0k}\|_2 \forall j = 1, \ldots, \# \text{ of main solution tracks}; k = 1, \ldots, S.$$

The separation covariance matrix is represented by the following expression:

$$dP_{j,0k} = P_{j,0} + P_{j,0k} - 2P^{cross}_{j,0,0k} \forall\, j = 1, \ldots, \#\text{ of main solution tracks};$$
$$k = 1, \ldots, S$$

where:

$P^{cross}_{j,0,0k} \equiv$ cross-correlation matrix between main filter 0 and sub-filter 0$k$.

A decision threshold is represented by the equation:

$$D_j = K_{j,FA}\sqrt{\lambda^{dP_{j,0k}}}$$

where:

$$K_{j,FA} = Q^{-1}\left(\frac{P_{j,FA}}{2}\right);\ Q(x) = \int_x^{\infty} e^{-u^2/2}du;$$

$\lambda^{dP_{j,0k}} \equiv$ maximum eigenvalue of the separation convariance matrix;

$K_{j,FA} \equiv$ false correlation coefficient for track $j$;

$P_{j,FA} \equiv$ user-selected probability of false correlation per independent measurement track for track $j$.

If a discriminator is less than a decision threshold ($d_{j,0k}<D_k \forall k$), then correlation is assured. This means that all contributing sensor measurement tracks to the main track from the current correlation epoch (and coasted internal tracks from the previous correlation epoch) are statistically consistent, and the correlation of measurement tracks from different surveillance sensors is assured. In this case, all contributing sensors to the track are maintained. The track (and all of its associated statistics) are then sent to the second prune function.

If a discriminator is greater than a decision threshold ($d_{j,0k}>D_j$), then for S=3, the sub-solution track k is statistically inconsistent with the main solution track and the other sub-solution tracks. The sensor contribution k is the miscorrelated or faulty surveillance sensor measurement track. The sensor weight for sensor contribution k is set to zero: $w_{j,k}=0$, and the sensor weight contribution k to the track weight, $w_j$, is removed. The track k is sent back to the data association function for potential correlation to the other tracks including tracks with contributions from one or two sensors. This additional correlation step is still subject to the association rules of the data association function. If S>3 and one sub-solution track is statistically inconsistent with the main solution track and the other sub-solution tracks, then sensor contribution k is the miscorrelated or faulty measurement track and the procedure outlined for S=3 is followed, where the sensor weight contribution k is removed and the track k is sent back to the data association function. If S>3 and more than one sub-solution track is statistically inconsistent with the main solution track and the other sub-solution tracks, then more than one measurement track contributing to the track is miscorrelated or faulty and the sub-sub solution tracks are used to detect and identify the miscorrelated or faulty measurement tracks.

Cooperative Tracks Only

In the scenario where only cooperative tracks are estimated based on sensor measurement tracks from cooperative sensors (ADS-B and TCAS Mode-S), the following approach can be applied. If S=N=1, and an internal track is based on an ADS-B sensor only, then integrity statistics are directly taken from the sensor statistics. If S=N=1, and an internal track is based on a TCAS Mode-S sensor only, then integrity statistics are directly taken from the sensor statistics. If S=N=2, and an internal track is based on an ADS-B sensor and a TCAS Mode-S sensor, two ADS-B sensors, or two TCAS Mode-S sensors, then integrity statistics are directly taken from the sensor statistics. If S=N≥3, then if an internal track is based on at least one TCAS Mode-S sensor, then range and altitude statistics are used to compute discriminators and thresholds. Note that the TCAS Mode-S sensor bearing errors are large, making bearing measurements limited for integrity analysis.

This approach using cooperative tracks only, has the benefits of identifying whether the ADS-B measurement track(s) is (are) consistent with the TCAS Mode S measurement tracks, and mitigates the effects of jamming and spoofing on the ADS-B measurement tracks.

Non-Cooperative Tracks Only

In the scenario where only non-cooperative tracks are estimated based on sensor measurement tracks from non-cooperative sensors (TCAS Mode-C, airborne radar, ground-based radar, or vision sensor), the following approach can be applied. If S=M=1 or S=M=2, then integrity statistics are directly taken from the sensor statistics. If S=M≥3 and a track is based on at least one TCAS Mode-C sensor, then the range and altitude statistics are used to compute discriminators and thresholds. Note that TCAS Mode-C sensor bearing errors are large, making bearing measurements limited for integrity analysis. If an internal track is not based on TCAS Mode-C sensors, then 3D position and range statistics are used to compute discriminators and thresholds.

This approach using non-cooperative tracks only, has the benefits of identifying statistically consistent non-cooperative surveillance sensor measurement tracks that are tracking an object, and mitigates the effects of sensor measurement track faults on the tracks.

Cooperative and Non-Cooperative Tracks

In the scenario where both cooperative and non-cooperative tracks are estimated based on sensor measurement tracks from cooperative and non-cooperative sensors, the following approach can be applied. If S=2, N=1, and M=1, then integrity statistics are directly taken from the sensor statistics. If S=M≥3 and a track is based on at least one TCAS Mode-S sensor or a TCAS Mode-C sensor, then the range and altitude statistics are used to compute discriminators and thresholds. Note that TCAS Mode-S and TCAS Mode-C sensor bearing errors are large, making bearing measurements limited for integrity analysis.

This approach using cooperative and non-cooperative tracks has the benefits of mitigating the effects of jamming and spoofing on the ADS-B measurement tracks, identifying statistically consistent non-cooperative surveillance sensor measurement tracks that are tracking an object, and mitigates the effects of sensor measurement track faults on the tracks.

The processing units and/or other computational devices used in the system and method described herein may be implemented using software, firmware, hardware, or appropriate combinations thereof. The processing units and/or other computational devices may be supplemented by, or incorporated in, specially-designed application-specific integrated circuits (ASICs) or field programmable gate arrays (FPGAs). The processing units and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system comprising: at least one processor onboard a vehicle; a plurality of surveillance sensors in operative communication with the at least one processor, the surveillance sensors comprising one or more cooperative sensors, one or more non-cooperative sensors, or a combination of one or more cooperative sensors and one or more non-cooperative sensors; and a detect and avoid module hosted by the at least one processor, the detect and avoid module configured to receive respective measurement tracks from the surveillance sensors, and including a tracking system configured to track one or more objects in an environment around the vehicle, wherein the tracking system comprises: a data association module that includes a track-to-track function operative to generate and output main solution tracks and sub-solution tracks with track information that includes a total number of tracks, and a track weight, a sensor weight, a state mean vector, and a state covariance matrix for each track; and an integrity module hosted by the at least one processor and in operative communication with the detect and avoid module, the integrity module comprising: a track integrity system in operative communication with the data association module, the track integrity system operative to provide integrity checks with fault detection and exclusion, which include one or more discriminators and one or more decision thresholds; wherein the track integrity system is operative to compare, select, and output a main solution track or one or more sub-solution tracks based on correlated tracks provided by the track-to-track function from the data association module and at least one solution separation technique; wherein the track integrity system is operative to send a track solution that passes integrity tests to a prune sub-function, and to send back the main solution track or the one or more sub-solution tracks that fail to pass the integrity tests to the data association module for further processing and to assure integrity of tracks correlated and estimated by the tracking system.

Example 2 includes the system of Example 1, wherein the data association module that includes a track-to-track function is operative to: compute a main solution track that corresponds to all sensor measurement tracks contributing to a given track; compute one or more sub-solution tracks based on the main solution track; and compute one or more sub-sub-solution tracks based on each sub-solution track; wherein when at least three sensors of the surveillance sensors provide measurement tracks, the one or more sub-solution tracks are configured to identify one sensor measurement track correlation fault, and the one or more sub-sub-solution tracks are configured to identify two sensor measurement track correlation faults.

Example 3 includes the system of Example 2, wherein: the main solution track is computed in a main filter that incorporates sensor measurement tracks from all S surveillance sensors contributing to an internal track, where S is total number of surveillance sensors contributing to a track; the one or more sub-solution tracks is computed in a sub-filter set including one or more sub-filters that incorporate surveillance sensor measurement tracks in S−1 combinations, where each sub-filter excludes a different sensor measurement track; and the one or more sub-sub-solution tracks is computed in one or more sub-sub-filter sets that each include one or more sub-sub-filters that incorporate surveillance sensor measurement tracks in S−2 combinations, where each sub-sub-filter excludes two sensor measurement tracks.

Example 4 includes the system of any of Examples 1-3, wherein the integrity checks module further comprises: an integrity requirements and statistics module in operative communication with the track integrity system.

Example 5 includes the system of any of Examples 1-4, wherein: the one or more cooperative sensors are operative to provide a respective first measurement track for each of the one or more objects in the environment around the vehicle, wherein each respective first measurement track includes a respective first track identifier (ID); and the one or more non-cooperative sensors comprise: a first category of non-cooperative sensors operative to provide a respective second measurement track for each of the one or more objects around the vehicle, wherein each respective second measurement track includes a respective second track ID; a second category of non-cooperative sensors including a first sub-category operative to provide consistent sequences of track measurements originating from a same object, but with inconsistent and changing track IDs; and a second sub-category operative to provide multiple measurement tracks with consistent IDs for an object, but with the multiple measurement tracks at a measurement epoch for the object; and a third category of non-cooperative sensors operative to provide measurement statistics without measurement track correlation or an ID.

Example 6 includes the system of Example 5, wherein: for the one or more cooperative sensors, the respective first track ID for each respective first measurement track is an International Civil Aviation Organization (ICAO) identification number; and the one or more cooperative sensors comprises an automatic dependent surveillance—broadcast (ADS-B) sensor, or a traffic collision avoidance system (TCAS) mode-S sensor.

Example 7 includes the system of any of Examples 5-6, wherein: for the first category of non-cooperative sensors, the respective second track ID for each respective second measurement track is a sensor specific ID; and the first category of non-cooperative sensors comprises a TCAS mode-C sensor.

Example 8 includes the system of any of Examples 5-7, wherein the second and third sensor categories of non-cooperative sensors comprise an airborne radar, a ground-based radar, or a vision sensor.

Example 9 includes the system of any of Examples 5-8, further comprising: a correlator system in operative communication with the detect and avoid module, the correlator system configured to receive measurement tracks or measurement returns from the second or third sensor categories of the one or more non-cooperative sensors, and to output one or more correlated measurement tracks; and a navigation system onboard the vehicle and operative to calculate a navigation solution for the vehicle, the navigation system in operative communication with the detect and avoid module, and with the correlator system.

Example 10 includes the system of Example 9, wherein the correlator system is operative to: identify sequences of measurements that originate from the same object regardless of type of non-cooperative sensor and sensor-provided measurement track ID; override any ID provided by a sensor and assign an ID to a measurement track itself for any non-cooperative sensors in the first sub-category; fuse measurement returns from multiple measurement tracks of a sensor to generate a fused measurement track and assign an ID to the fused measurement track, overriding any track ID assigned by the sensor, for any non-cooperative sensors in the second sub-category; and identify sequences of measurement returns that originate from the same object and assign the sequences an ID for any non-cooperative sensors in the third category.

Example 11 includes the system of any of Examples 9-10, wherein the tracking system is configured to process the respective first measurement track from the one or more cooperative sensors, the respective second measurement track from the first category of the one or more non-cooperative sensors, and the one or more correlated measurement tracks from the correlator system.

Example 12 includes the system of any of Examples 9-11, wherein the tracking system is operative to fuse respective measurement tracks from the one or more cooperative sensors and the one or more non-cooperative sensors to estimate an optimal track, with assured integrity, for each object in the environment around the vehicle.

Example 13 includes the system of any of Examples 9-12, wherein the detect and avoid module further comprises an evaluation and guidance system configured to receive the optimal track, with assured integrity, and to provide guidance data to one or more vehicle applications such that the vehicle can be operated to avoid any objects in the environment around the vehicle.

Example 14 includes the system of any of Examples 1-13, wherein the vehicle is an ownship aircraft, and the one or more objects include intruder aircraft.

Example 15 includes the system of any of Examples 1-14, wherein the vehicle is an uncrewed aircraft.

Example 16 includes the system of Example 15, wherein the uncrewed aircraft is part of an uncrewed aircraft system (UAS).

Example 17 includes the system of any of Examples 1-16, wherein the vehicle is an urban air mobility (UAM) vehicle.

Example 18 includes a method for assuring integrity of sensor tracks estimated by a detect and avoid tracking system, the method comprising: providing a data association module that includes a track-to-track function, in the detect and avoid tracking system; and providing an integrity checks module that communicates with the data association module, and includes a fault detection and exclusion (FDE) function with a set of discriminators and decision thresholds; wherein the data association module performs a process comprising: sending a state mean vector $x_j$ and a state covariance matrix $P_j$ for all main solution tracks $(x_{j,0}, P_{j,0})$ to the integrity checks module and to a first subtractor; sending a state mean vector and a state covariance matrix for a first sub-solution track $(x_{j,01}, P_{j,01})$ to the first subtractor; wherein a differential $(dx_{j,01}, dP_{j,01})$ is calculated and sent by the first subtractor to the integrity checks module for use in the FDE function, and the state covariance matrix for the first sub-solution track $(P_{j,01})$ is sent to the integrity checks module for use in the FDE function; and sending a state mean vector and a state covariance matrix for each additional sub-solution track $(x_{j,0n}, P_{j,0n})$, where n=2 . . . S to one or more additional subtractors, which also receive the state mean vector and the state covariance matrix for all main solution tracks $(x_{j,0}, P_{j,0})$; wherein one or more additional differentials $(dx_{j,0n}, dP_{j,0n})$ is calculated and sent by the one or more additional subtractors to the integrity checks module for use in the FDE function, and the state covariance matrix for each additional sub-solution track $(P_{j,0n})$ is sent to the integrity checks module for use in the FDE function.

Example 19 includes the method of Example 18, wherein the integrity checks module performs the FDE function using the set of discriminators and decision thresholds, to compare, select and output a main solution track or one or more sub-solution tracks to a prune function, and output the main solution track or the one or more sub-solution tracks to the data association module for further processing.

Example 20 includes the method of Example 19, wherein if a discriminator is less than a decision threshold for a given internal track, then all contributing sensor measurement tracks from a current correlation epoch to the track are statistically consistent, and correlation of measurement tracks from different surveillance sensors is assured.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:

at least one processor onboard a vehicle;

a plurality of surveillance sensors onboard the vehicle and in operative communication with the at least one processor, the surveillance sensors comprising one or more cooperative sensors, one or more non-cooperative sensors, or a combination of one or more cooperative sensors and one or more non-cooperative sensors; and a detect and avoid module hosted by the at least one processor, the detect and avoid module configured to receive respective measurement tracks from the surveillance sensors, and including a tracking system operative to track one or more objects in an environment around the vehicle, wherein the tracking system comprises:

a data association module that includes a track-to-track function operative to generate and output main solution tracks and sub-solution tracks with track information that includes a total number of tracks, and a track weight, a sensor weight, a state mean vector, and a state covariance matrix for each track; and an integrity module hosted by the at least one processor and in operative communication with the detect and avoid module, the integrity module comprising:

a track integrity system in operative communication with the data association module, the track integrity system operative to provide integrity checks with fault detection and exclusion, which include one or more discriminators and one or more decision thresholds;

wherein the track integrity system is operative to compare, select, and output a main solution track or one or more sub-solution tracks based on associated, or correlated, tracks provided by the track-to-track function from the data association module and at least one solution separation technique;

wherein the track integrity system is operative to select and send a track solution that passes integrity tests to a prune sub-function, and to send back the main solution track or the one or more sub-solution tracks that fail to pass the integrity tests to the data association module for further processing and to assure integrity of tracks correlated and estimated by the tracking system;

wherein the detect and avoid module is operative to process the tracks, with assured integrity, to compute guidance data that is sent to onboard vehicle guidance and control systems such that the vehicle is operated to avoid the one or more objects.

2. The system of claim 1, wherein the data association module that includes a track-to-track function is operative to:

compute a main solution track that corresponds to all sensor measurement tracks contributing to a given track;

compute one or more sub-solution tracks based on the main solution track; and compute one or more sub-sub-solution tracks based on each sub-solution track;

wherein when at least three sensors of the surveillance sensors provide measurement tracks, the one or more sub-solution tracks identify one sensor measurement track correlation fault, and the one or more sub-sub-solution tracks identify two sensor measurement track correlation faults.

3. The system of claim 2, wherein:

the main solution track is computed in a main filter that incorporates sensor measurement tracks from all S surveillance sensors contributing to an internal track, where S is total number of surveillance sensors contributing to a track;

the one or more sub-solution tracks is computed in a sub-filter set including one or more sub-filters that incorporate surveillance sensor measurement tracks in S−1 combinations, where each sub-filter excludes a different sensor measurement track; and the one or more sub-sub-solution tracks is computed in one or more sub-sub-filter sets that each include one or more sub-sub-filters that incorporate surveillance sensor measurement tracks in S−2 combinations, where each sub-sub-filter excludes two sensor measurement tracks.

4. The system of claim 1, wherein the integrity checks module further comprises:

an integrity requirements and statistics module in operative communication with the track integrity system.

5. The system of claim 1, wherein:

the one or more cooperative sensors are operative to provide a respective first measurement track for each of the one or more objects in the environment around the vehicle, wherein each respective first measurement track includes a respective first track identifier (ID); and the one or more non-cooperative sensors comprise:

a first category of non-cooperative sensors operative to provide a respective second measurement track for each of the one or more objects around the vehicle, wherein each respective second measurement track includes a respective second track ID;

a second category of non-cooperative sensors including a first sub-category operative to provide consistent sequences of track measurements originating from a same object, but with inconsistent and changing track IDs; and a second sub-category operative to provide multiple measurement tracks with consistent IDs for an object, but with the multiple measurement tracks at a measurement epoch for the object; and a third category of non-cooperative sensors operative to provide measurement statistics without measurement track correlation or an ID.

6. The system of claim 5, wherein:

for the one or more cooperative sensors, the respective first track ID for each respective first measurement track is an International Civil Aviation Organization (ICAO) identification number; and the one or more cooperative sensors comprises an automatic dependent surveillance-broadcast (ADS-B) sensor, or a traffic collision avoidance system (TCAS) mode-S sensor.

7. The system of claim 5, wherein:

for the first category of non-cooperative sensors, the respective second track ID for each respective second measurement track is a sensor specific ID; and the first category of non-cooperative sensors comprises a TCAS mode-C sensor.

8. The system of claim 5, wherein the second and third sensor categories of non-cooperative sensors comprise an airborne radar, a ground-based radar, or a vision sensor.

9. The system of claim 5, further comprising:

a correlator system in operative communication with the detect and avoid module, the correlator system configured to receive measurement tracks or measurement returns from the second or third sensor categories of the one or more non-cooperative sensors, and to output one or more correlated measurement tracks; and a navigation system onboard the vehicle and operative to calculate a navigation solution for the vehicle, the navigation system in operative communication with the detect and avoid module, and with the correlator system.

10. The system of claim 9, wherein the correlator system is operative to:

identify sequences of measurement returns that originate from the same object regardless of type of non-cooperative sensor and sensor-provided measurement track ID;

override any ID provided by a sensor and assign an ID to a measurement track itself for any non-cooperative sensors in the first sub-category;

fuse measurement returns from multiple measurement tracks of a sensor to generate a fused measurement track and assign an ID to the fused measurement track, overriding any track ID assigned by the sensor, for any non-cooperative sensors in the second sub-category; and identify sequences of measurement returns that originate from the same object and assign the sequences an ID for any non-cooperative sensors in the third category.

11. The system of claim 9, wherein the tracking system is configured to process the respective first measurement track from the one or more cooperative sensors, the respective second measurement track from the first category of the one or more non-cooperative sensors, and the one or more correlated measurement tracks from the correlator system.

12. The system of claim 11, wherein the tracking system is operative to fuse respective measurement tracks from the one or more cooperative sensors and the one or more non-cooperative sensors to estimate an optimal track, with assured integrity, for each object in the environment around the vehicle.

13. The system of claim 12, wherein the detect and avoid module further comprises an evaluation and guidance system configured to receive the optimal track, with assured integrity, and to provide guidance data to one or more vehicle applications such that the vehicle can be operated to avoid any objects in the environment around the vehicle.

14. The system of claim 1, wherein the vehicle is an ownship aircraft, and the one or more objects include intruder aircraft.

15. The system of claim 1, wherein the vehicle is an uncrewed aircraft.

16. The system of claim 15, wherein the uncrewed aircraft is part of an uncrewed aircraft system (UAS).

17. The system of claim 1, wherein the vehicle is an urban air mobility (UAM) vehicle.

18. A method for assuring integrity of sensor tracks estimated by a detect and avoid tracking system onboard a vehicle, the method comprising:

providing a data association module that includes a track-to-track function, in the detect and avoid tracking system; and providing an integrity checks module that communicates with the data association module, and includes a fault detection and exclusion (FDE) function with a set of discriminators and decision thresholds;

sending respective measurement tracks from a plurality of surveillance sensors, onboard the vehicle, to the detect and avoid tracking system;

wherein the data association module performs a process comprising:

sending a state mean vector $x_j$ and a state covariance matrix $P_j$ for all main solution tracks $(x_{j,0}, P_{j,0})$ to the integrity checks module and to a first subtractor;

sending a state mean vector and a state covariance matrix for a first sub-solution track $(x_{j,01}, P_{j,01})$ to the first subtractor;

wherein a differential $(dx_{j,01}, dP_{j,01})$ is calculated and sent by the first subtractor to the integrity checks module for use in the FDE function, and the state covariance matrix for the first sub-solution track $(P_{j,01})$ is sent to the integrity checks module for use in the FDE function; and sending a state mean vector and a state covariance matrix for each additional sub-solution track $(x_{j,0n}, P_{j,0n})$, where n=2 . . . S to one or more additional subtractors, which also receive the state mean vector and the state covariance matrix for all main solution tracks $(x_{j,0}, P_{j,0})$;

wherein one or more additional differentials $(dx_{j,0n}, dP_{j,0n})$ is calculated and sent by the one or more additional subtractors to the integrity checks module for use in the FDE function, and the state covariance matrix for each additional sub-solution track $(P_{j,0n})$ is sent to the integrity checks module for use in the FDE function;

processing the sensor tracks, with assured integrity, in the detect and avoid tracking system to compute guidance data; and sending the guidance data to onboard vehicle guidance and control systems such that the vehicle is operated to avoid the one or more objects.

19. The method of claim 18, wherein the integrity checks module performs the FDE function using the set of discriminators and decision thresholds, to compare, select and output a main solution track or one or more sub-solution tracks to a prune function, and output the main solution track or the one or more sub-solution tracks to the data association module for further processing.

20. The method of claim 19, wherein if a discriminator is less than a decision threshold for a given internal track, then all contributing sensor measurement tracks from a current correlation epoch to the track are statistically consistent, and correlation of measurement tracks from different surveillance sensors is assured.

* * * * *